United States Patent [19]

Tuckey

[11] Patent Number: 5,415,146
[45] Date of Patent: May 16, 1995

[54] SUPPLEMENTAL IN-TANK FILTER

[75] Inventor: Charles H. Tuckey, Cass City, Mich.

[73] Assignee: Walbro Corporation, Cass City, Mich.

[21] Appl. No.: 168,073

[22] Filed: Dec. 14, 1993

[51] Int. Cl.⁶ .................. F02M 37/10; F02M 39/00
[52] U.S. Cl. ................................ 123/509; 137/113
[58] Field of Search ............. 123/509, 510; 137/545, 137/565, 571, 113; 417/423.3

[56] References Cited

U.S. PATENT DOCUMENTS

| | | | |
|---|---|---|---|
| 4,747,388 | 5/1988 | Tuckey | 123/514 |
| 4,776,315 | 10/1988 | Greiner | 123/509 |
| 4,807,582 | 2/1989 | Tuckey | 137/113 |
| 4,831,990 | 5/1989 | Tuckey | 137/565 |
| 4,869,225 | 9/1989 | Nagata et al. | 123/509 |
| 4,964,787 | 10/1990 | Hoover | 417/363 |
| 4,971,017 | 11/1990 | Beakley et al. | 137/113 |
| 4,974,570 | 12/1990 | Szwargulski et al. | 137/113 |
| 5,146,901 | 9/1992 | Jones | 123/509 |
| 5,170,764 | 12/1992 | Tuckey | 123/509 |
| 5,218,942 | 6/1993 | Coha et al. | 123/509 |
| 5,237,977 | 8/1993 | Tuckey | 123/510 |

Primary Examiner—Tony M. Argenbright
Assistant Examiner—Thomas N. Moulis
Attorney, Agent, or Firm—Barnes, Kisselle, Raisch, Choate, Whittemore & Hulbert

[57] ABSTRACT

An in-tank module with an electrical fuel pump in a reservoir in a main fuel tank of a vehicle. A filter sock on the bottom of the tank has an outlet in direct communication with the main pump inlet so the pump can prime directly from fuel in the main tank. A secondary fuel outlet in the reservoir and in communication with the pump inlet, is controlled by a valve which opens the secondary fuel outlet when the main pump inlet is starved by reason of low fuel in the main tank. A filter element, above the secondary fuel outlet, filters fuel flowing from the reservoir to the pump outlet when the control valve is open.

8 Claims, 2 Drawing Sheets

SUPPLEMENTAL IN-TANK FILTER

FIELD OF INVENTION

Fuel pumps for internal combustion engines and particularly electrically-operated pumps housed in a reservoir disposed in a main fuel tank of a vehicle.

BACKGROUND OF THE INVENTION

In recent years the supplying of hydrocarbon fuel, such as gasoline, to an internal combustion engine has progressed from gravity fuel feed and the use of cam-operated fuel pumps in an engine compartment, to the use of electrically-operated fuel pumps located in the main fuel tank of a vehicle. A further development has been the use of an upright cylindrical reservoir within the main fuel tank which houses the fuel pump in a substantially vertical position. The reservoir has a volume substantially larger than the pump housing and can serve to hold a supply of fuel independent of the fuel level in the main tank. In some fuel systems, the circuit includes a fuel line from the pump to the engine and a pressure regulator valve responds to excess pressure at the fuel rail (distributor) to by-pass fuel back to the reservoir. In other fuel systems, the reservoir receives fuel from the vapor outlets of the straight turbine pumps or the two-stage pumps and thus has the reserve fuel when needed.

As illustrated in U.S. Pat. No. 4,964,787 (Oct. 23, 1990), fuel from the tank is usually filtered through a sock filter connected to fuel pump inlet at the base of the reservoir. A sock valve is connected to the pump inlet.

As illustrated in U.S. Pat. No. 4,747,388 (May 31, 1988), a valve at the bottom of the reservoir is responsive to a diaphragm actuated by low fuel level in the main tank to cause the fuel pump to draw fuel from the reservoir itself. The diaphragm itself is a filter for fuel from the main tank.

It has been found that dirt particles get into the reservoir during assembly in the original installation. Also, the top of the reservoir is not always completely closed and objectionable particles may enter the reservoir from the surrounding atmosphere or fuel. Also, return fuel from the system entering the reservoir may pick up some contamination from the lines which can accumulate in the reservoir.

SUMMARY OF THE INVENTION

An in-tank reservoir carrying an electrical fuel pump is located in a main fuel tank of a vehicle. At the bottom of the reservoir is a sock-type filter resting on the bottom of the main fuel tank and having a filter outlet leading to a pump inlet port in the reservoir. An upstanding filter cartridge is mounted over a secondary fuel port in the bottom of the reservoir and a control valve controls the opening and closing of the secondary fuel port. Passages in the reservoir connect the secondary fuel port to the pump inlet port. The control valve is responsive to a diaphragm underlying the pump inlet port and the secondary fuel port. This diaphragm associated with the control valve is responsive to suction pressure in the pump inlet port, under conditions of low fuel in the main tank, to open the control valve and cause the pump to draw filtered fuel from the reservoir through the filter cartridge to the pump inlet port. The pump inlet is in open communication with the fuel in the main fuel tank and can thus prime instantly when the pump is started.

An object of the invention is to provide a system in which the pump can prime directly from the main fuel tank in starting. It is not necessary to have fuel in the reservoir in order to prime the pump.

Another object of the invention is to provide a supplemental filter of simple construction which can filter fuel passing from the reservoir to the pump inlet under certain conditions of low fuel level in the main tank. It is a further object to provide an effective transfer valve which opens the fuel in the reservoir to the pump inlet.

These and other objects and features of the invention will be apparent in the following detailed description and claims in which the details of the invention are set forth to enable persons skilled in the art to practice the invention, all in connection with the best mode presently contemplated for the invention.

BRIEF DESCRIPTION OF THE DRAWINGS

DRAWINGS accompany the disclosure and the various views thereof may be briefly described as.

DETAILED DESCRIPTION OF THE INVENTION AND THE MANNER AND PROCESS OF USING IT

Figure 1:
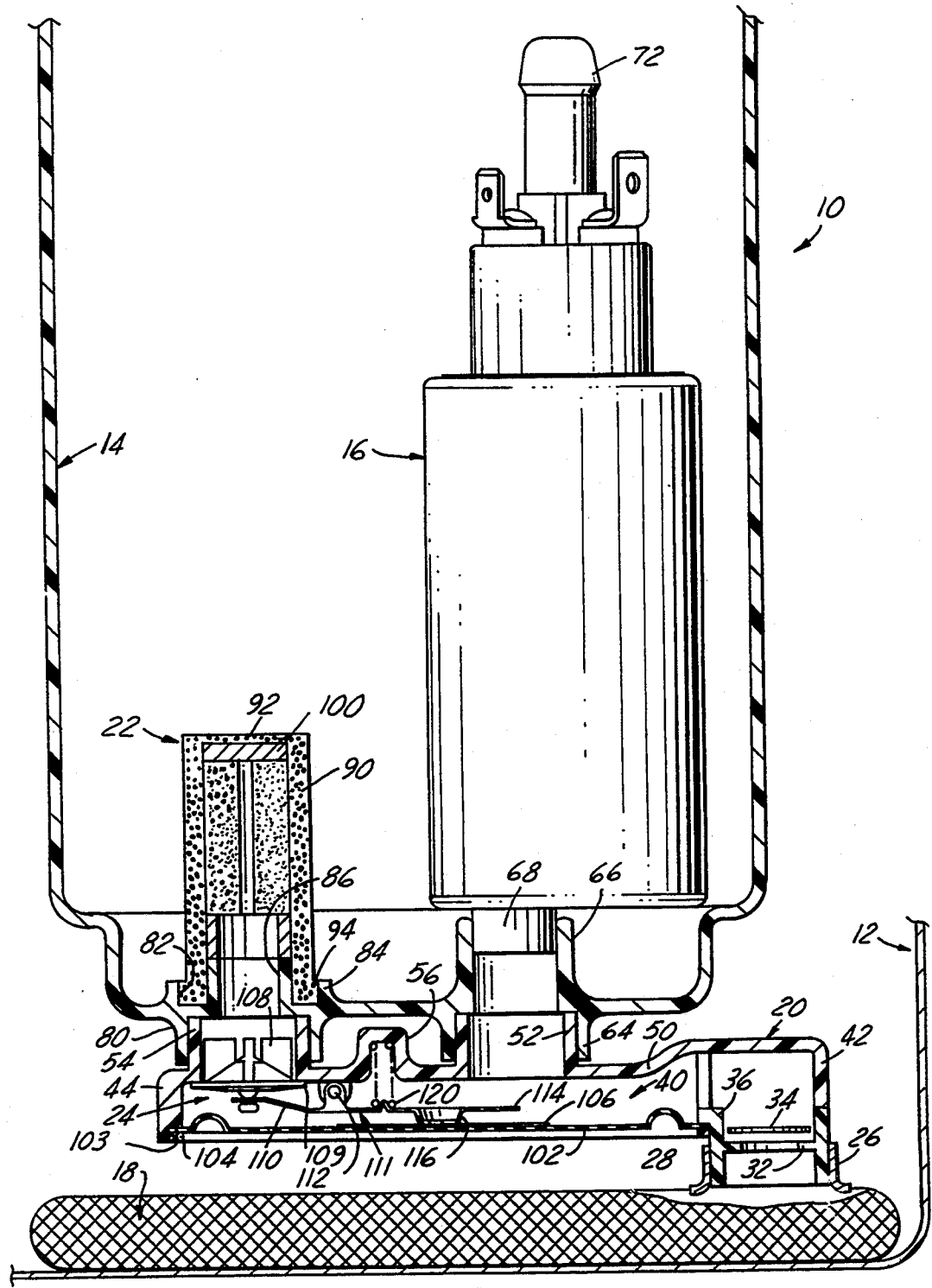
FIG. 1 is a sectional view of a fuel reservoir and pump module embodying this invention disposed in a fuel tank.
Figure 2:
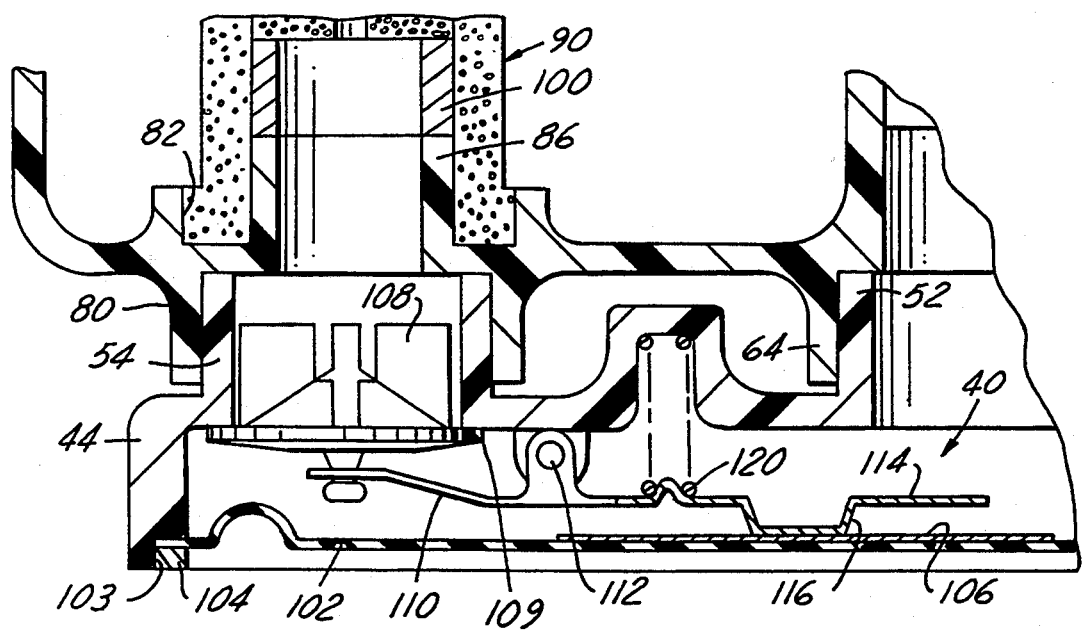
FIG. 2 is an enlarged view of the bottom of the reservoir and a diaphragm operated valve.
Figure 3:
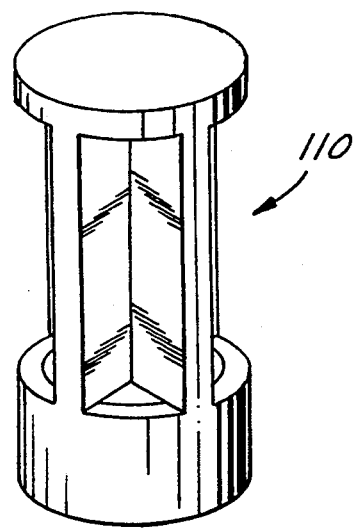
FIG. 3 is a perspective view of a reinforcing cage support for a filter cartridge.

Referring in more detail to the drawings, FIG. 1 illustrates a fuel module 10 embodying this invention, mounted in a fuel tank 12 of an automotive vehicle (not shown). The module has a fuel reservoir 14 with an electric fuel pump 16 mounted therein. In normal operation, fuel is supplied to the pump 16 directly from the vehicle tank 12 through a filter sock 18 carried by an intake housing 20 mounted on the bottom of the reservoir 14. When operating with a low fuel level in the vehicle tank 12, fuel is supplied to the pump from the reservoir 14 through an auxiliary filter assembly 22 and a diaphragm control valve assembly 24.

The intake housing 20 has a downwardly extending hollow projection 26 which receives the neck 28 of a sock type filter unit 20 which rests on the bottom of the fuel tank 12. The projection 26 has a valve seat 32 formed inwardly of the projection to support a disc valve 34. The passage 36 above the valve 34 opens to a laterally extending chamber 40 extending from the outer wall of the housing at 42 to the other side 44 as illustrated in FIG. 1.

The top 50 of the housing 24 has a centrally located hollow, upstanding boss 52 which forms a pump inlet. At the left side of the housing 24 as viewed in the drawing (FIG. 1) is a secondary hollow boss 54. Between the boss 52 and the boss 54 is a raised pocket 56 forming a spring seat as will be described.

The housing 24 is connected to the bottom wall 60 of the upright fuel reservoir 44. The bottom wall 60 has a depending boss 64 which fits over boss 52 of the housing 24. On the bottom wall 60 of the reservoir is an upstanding nipple 66, above the passage formed by the interfitting bosses 52 and 64. This nipple receives an inlet fitting 68 on the fuel pump 16 which is supported in the reservoir 62. The pump 70 can be an electrically-operated unit as described in detail in U.S. Pat. No. 4,820,139 (Apr. 11, 1989) having an outlet fitting 72 to be connected to a fuel line of a vehicle engine.

On the left side of the drawing of FIG. 1 is a second depending boss 80 which interfits with boss 54 of the housing 24. Above the boss 80 is an annular recess 82 formed by an annular lip 84 on the outside and an upstanding inlet nipple 86 on the inside. The filter assembly 22 has an annular filter element 90 with a closure top 92 and a bottom annular flange 94 which fits into the recess 82. The filter element 90 is preferably formed of a square-weave filter material having pores ranging from 40 to 70 microns. Other equivalent materials may be utilized. The filter element 90 is reinforced by a form retainer 100 formed as an open ended and open sided cylinder of metal or plastic with sufficient rigidity to prevent collapse of the filter element 90.

The valve assembly 24 has a flexible diaphragm 102 with its periphery fitted into an annular recess 103 in the housing 24. An annular retainer ring 104 is inserted tightly over the diaphragm periphery and ultrasonically welded in place to secure the diaphragm. A central reinforcing plate 106 overlies the diaphragm. It will be apparent that the diaphragm is exposed to, and subject to, pressures in chamber 40. Below the boss 54 a valve seat is formed and a valve element 108 with a seating flange 109 is supported above the diaphragm 102 by one end 110 of a lever 111 pivoted at 112 adjacent the raised element 56. The other end 114 of the lever extends over the diaphragm and has a depressed dimple 116 which rides on the center disc 106 of the diaphragm. A coil spring 120 has one end seated in the recess 56 in the housing and the other end seated on the lever arm 114.

Accordingly, it will be seen that an upward movement of the diaphragm 102 will open valve element 108 against the pressure of spring 120, and the spring 120 will close the valve under normal operating conditions. The check valve 34 retains fuel in the reservoir when the pump is not operating. It will be appreciated that the reservoir receives fuel from a return line in the system, a by-pass from the pump outlet 72, or from a jet pump which is part of the pump assembly 16 so that it remains full of fuel unless the main fuel tank supply is depleted.

When the main fuel tank 20 has an ample supply of fuel, the operating pump 70 creates a drawing pressure in chamber 40 and fuel will flow through valve seat 32 to chamber 40 and the fuel pump inlet 68. Under these conditions, spring 120 keeps the valve 108 closed. However, if the fuel level in the main tank reaches a low level, there will be a decreased pressure in chamber 40 as the pump inlet is starved of fuel. This decreased pressure will act on the diaphragm 102 and cause the lever arm 114 to rise against the spring 120. This will lower the lever arm 110 and open valve 108 allowing fuel to flow from the reservoir through the filter 90 and the secondary inlet nipple 86 to the pump inlet 68. Thus, fuel from the reservoir is filtered before it reaches the pump and passes to the pump outlet lines to the engine.

It will be noted that normally the pump inlet 68 is in direct communication with the filter inlet at 26 and thus with the fuel in the fuel tank. Thus, the pump can prime immediately and directly from the fuel tank when started. This distinguishes from other systems in which the pump pulls fuel from the reservoir in starting and it is necessary to deliver fuel to the reservoir before the pump will prime.

What is claimed is:

1. A fuel pump module for installation in a vehicle fuel tank which comprises, a reservoir with a closed bottom for containing liquid fuel, a housing carried by said reservoir, a flexible and imperforate diaphragm carried by said housing and defining in cooperation with said housing a fuel inlet chamber disposed below said reservoir, a first fuel inlet to said chamber from the tank which communicates with the fuel tank adjacent the bottom thereof, said first fuel inlet being separate from said diaphragm, a primary fuel filter communicating with said fuel inlet and disposed adjacent the bottom of the vehicle fuel tank, a second inlet to said fuel chamber communicating with only said reservoir adjacent the bottom thereof, a valve associated with said second inlet and movable to an open position to admit fuel from said reservoir into said fuel chamber and to a closed position to close off said fuel chamber from communicating with said reservoir, said valve being yieldably biased to its closed position and operably coupled with said diaphragm to be moved to its open position in response to displacement of said diaphragm, and an electric fuel pump received in said reservoir and having an outlet delivering fuel under pressure to an engine of the vehicle and an inlet communicating with said fuel chamber so that when the pump is operating and there is an adequate level of fuel in the tank the valve is closed and the pump draws fuel through the primary filter, first inlet, fuel chamber and into the pump inlet to supply fuel under pressure to the pump outlet for an engine of the vehicle and under conditions of a sufficiently low fuel level in the tank, the pump reduces the pressure in the fuel chamber and thereby displaces the diaphragm which opens the normally closed valve to supply fuel from the reservoir through the second inlet, into the fuel chamber and to the pump inlet for supplying fuel to the pump outlet for the engine, and if the operating pump removes substantially all of the fuel from both the reservoir and the fuel tank, and is turned off, the yieldably biased valve will close so that when fuel is added to the vehicle fuel tank and the pump is restarted, it will prime immediately and directly from the fuel tank.

2. The fuel pump module as defined in claim 1 in which said valve is yieldably biased to its closed position by a spring.

3. The fuel pump module as defined in claim 1 wherein said valve is operably connected with said diaphragm by a lever pivotally carried by said housing, operably connected with said valve and responsive to movement of said diaphragm to pivot said lever to open said valve.

4. The fuel pump module as defined in claim 3 which also comprises a spring bearing on said lever to yieldably urge said valve toward its closed position.

5. The fuel pump module as defined in claim 1 which also comprises a secondary filter received in said reservoir and communicating with said second inlet to filter fuel flowing from said reservoir through said second inlet and into said fuel chamber.

6. The fuel pump module as defined in claim 5 in which said second filter comprises, a hollow cylinder of filter material closed at one end and open at the other end to said second inlet, and a support received in said cylinder to provide support for said filter material.

7. The fuel pump module as defined in claim 1 which comprises, a check valve in said first inlet which closes to prevent reverse flow of liquid fuel from said fuel chamber through said first inlet to the vehicle tank.

8. The fuel pump module as defined in claim 1 wherein said primary filter comprises a material through which liquid fuel from the tank will pass and when exposed to air will resist the passage of air due to the surface tension of liquid fuel in the material.

* * * * *